United States Patent
Yoon et al.

(10) Patent No.: US 9,794,548 B2
(45) Date of Patent: Oct. 17, 2017

(54) 3-DIMENSIONAL IMAGE DISPLAY DEVICE

(71) Applicant: SAMSUNG DISPLAY CO., LTD., Yongin, Gyeonggi-Do (KR)

(72) Inventors: Hyun-Sik Yoon, Yongin (KR); Jae Hyoung Park, Yongin (KR); Jun Pyo Lee, Yongin (KR); Seung Hwan Moon, Yongin (KR); Dong Won Park, Yongin (KR); Byung Kil Jeon, Yongin (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 139 days.

(21) Appl. No.: 14/278,677

(22) Filed: May 15, 2014

(65) Prior Publication Data

US 2014/0354706 A1 Dec. 4, 2014

(30) Foreign Application Priority Data

May 28, 2013 (KR) ........................ 10-2013-0060449

(51) Int. Cl.
*G09G 5/12* (2006.01)
*H04N 13/04* (2006.01)
*G09G 3/00* (2006.01)
*G09G 3/36* (2006.01)
*H04N 13/00* (2006.01)
*G09G 3/18* (2006.01)

(52) U.S. Cl.
CPC ......... *H04N 13/0422* (2013.01); *G09G 3/003* (2013.01); *G09G 3/3688* (2013.01); *H04N 13/0033* (2013.01); *H04N 13/0438* (2013.01); *H04N 13/0454* (2013.01); *H04N 13/0497* (2013.01); *G09G 2310/027* (2013.01); *G09G 2320/0673* (2013.01)

(58) Field of Classification Search
CPC ........... H04N 13/0438; H04N 13/0454; H04N 13/0497; H04N 13/0422; G09G 2310/027; G09G 2320/0673; G09G 3/003
USPC ......................................................... 345/690
See application file for complete search history.

(56) References Cited

U.S. PATENT DOCUMENTS

| 8,199,138 B2 | 6/2012 | Koo et al. |
| 2011/0058024 A1* | 3/2011 | Choi ..................... G09G 3/003 348/51 |
| 2011/0074938 A1 | 3/2011 | Nakahata |

(Continued)

FOREIGN PATENT DOCUMENTS

| CN | 102469337 A1 | 5/2012 |
| EP | 2 455 933 A2 | 7/2011 |

(Continued)

*Primary Examiner* — Kwin Xie
(74) *Attorney, Agent, or Firm* — Lee & Morse, P.C.

(57) ABSTRACT

A 3-dimensional image display device includes a signal controller, a data driver, a display panel, and glasses. The signal controller includes a reference gamma data generator to correct image data. The data driver includes a gray voltage generator to generate a gray voltage based on the corrected image data. The display panel displays left-eye and right-eye images based on a data voltage from the data driver. The lenses of the glasses are controlled by a glasses synchronization signal from the signal controller, to compensate for charging rates of the left-eye and right-eye images.

20 Claims, 14 Drawing Sheets

(56) References Cited

U.S. PATENT DOCUMENTS

| | | | |
|---|---|---|---|
| 2011/0096105 A1* | 4/2011 | Park | H04N 13/0452 |
| | | | 345/690 |
| 2011/0261029 A1 | 10/2011 | Moon et al. | |
| 2011/0273439 A1 | 11/2011 | Son et al. | |
| 2011/0273463 A1* | 11/2011 | Lee | G02B 27/2264 |
| | | | 345/545 |
| 2011/0279466 A1 | 11/2011 | Park et al. | |
| 2011/0279659 A1* | 11/2011 | Jung | G09G 3/3648 |
| | | | 348/54 |
| 2011/0310090 A1 | 12/2011 | Kim et al. | |
| 2012/0120058 A1 | 5/2012 | Lee et al. | |
| 2012/0120067 A1 | 5/2012 | Kim et al. | |
| 2012/0169720 A1 | 7/2012 | Moh et al. | |
| 2013/0002834 A1 | 1/2013 | Aiba | |
| 2013/0250075 A1* | 9/2013 | Nakagawa | H04N 13/0438 |
| | | | 348/55 |

FOREIGN PATENT DOCUMENTS

| | | |
|---|---|---|
| JP | 2011-059658 A | 3/2011 |
| JP | 2012-108514 A | 6/2012 |
| KR | 10-2012-0053159 A | 5/2012 |

\* cited by examiner

FIG.4

| 3D_en | option_en | 3D_sync | GMA |
|---|---|---|---|
| 0 | x | x | 2D GMA |
| 1 | 1 | x | 3D GMA |
| 1 | 0 | 1 | 3D GMA |
| 1 | 0 | 0 | 2D GMA |

FIG.8

| 3D_en | option_en | 3D_sync | GMA |
|---|---|---|---|
| 0 | x | x | 2D GMA |
| 1 | 1 | x | 3D GMA1 |
| 1 | 0 | 1 | 3D GMA1 |
| 1 | 0 | 0 | 3D GMA2 |

FIG.13

| 3D_en | option_en | 3D_sync | ACC |
|---|---|---|---|
| 0 | x | x | 2D ACC |
| 1 | 1 | x | 3D ACC 1 |
| 1 | 0 | 1 | 3D ACC 1 |
| 1 | 0 | 0 | 3D ACC 2 |

3-DIMENSIONAL IMAGE DISPLAY DEVICE

CROSS-REFERENCE TO RELATED APPLICATION

Korean Patent Application No. 10-2013-0060449, filed on May 28, 2013, and entitled "3-Dimensional Image Display Device," is incorporated by reference herein in its entirety.

BACKGROUND

1. Field

One or more embodiments described herein relate to a display device.

2. Description of the Related Art

Services are expected to be developed that require fast transceiving of information using a super high speed information communication network. Such services may include, for example, telephone call services and multimedia services. Examples of multimedia services including ones that receive and process information including characters, voices, and images on a digital terminal at a high speed. One type of service that is expected to be developed is transcendental space realistic 3-dimensional information communication services for enabling users to realistically and 3-dimensionally view, feel, and enjoy multimedia by transcending time and space.

In general, a stereoscopic image expressed in 3 dimensions may be implemented based on a stereo visual principle a view disparity between the two eyes (e.g., a binocular disparity). These effects may be exhibited due to a separation of the two eyes by approximately 65 mm, which may be a factor in producing the 3-dimensional effect. More specifically, it is understood that the left and right eyes view different 2D images, respectively. When the two images are transferred to the brain through retinas, the brain accurately converges the images to produce a perceptional depth and reality of an original 3D image. The aforementioned capability has been referred to as stereography.

A 3-dimensional image display device, which operates according to the binocular disparity principle, may employ a stereoscopic polarized method and a stereoscopic time division method, an autostereoscopic parallax-barrier method, a lenticular method, and/or a blinking light method according to whether a viewer separately wears glasses.

An autostereoscopic 3-dimensional image display device separates an image into a left eye image and a right eye image using, for example, a lenticular lens layer on a liquid crystal display device. The autostereoscopic 3-dimensional image display device has an advantage in that a viewer directly views a screen to watch a 3-dimensional image without glasses. However, devices of this type may experience a disadvantage in the form of deterioration of a 3-dimensional effect, as a result of because the right-eye image not being accurately discriminated from a left-eye image.

A stereoscopic 3-dimensional image display device may incur additional cost relating to the use of separate eyeglasses. But, such a device may be preferred by some users because of its ability to discriminate a left-eye image from a right-eye image, thereby producing an improved 3-dimensional effect.

A time divisional stereoscopic 3-dimensional image display device has an advantage, in that resolution of the left-eye and right-eye images does not deteriorate. However, such devices may experience flicker due to a change in the amount of charging produced by polarity reversal when left-eye and right-eye images are displayed.

SUMMARY

In accordance with one embodiment, a 3-dimensional image display device includes a signal controller including a reference gamma data generator configured to correct and output image data; a data driver including a gray voltage generator configured to generate a gray voltage according to an output of the reference gamma data generator, and configured to receive the image data corrected by the signal controller; a display panel including a plurality of pixels and configured to display a left eye image and a right eye image based on a data voltage output from the data driver; and glasses including a left-eye lens and a right-eye lens controlled by a glasses synchronization signal from the signal controller, wherein the signal controller compensates for charging rates of the left eye image and the right eye image based on the glasses synchronization signal.

The reference gamma data generator may include a lookup table for a 2-dimensional image and a lookup table for a 3-dimensional image, and the signal controller uses a different lookup table, selected between the lookup table for the 2-dimensional image and the lookup table for the 3-dimensional image of the reference gamma data generator, for the left eye image and the right eye image based on the glasses synchronization signal.

A polarity of the data voltage applied to the display panel may be reversed for predetermined frames, and when an image applied, together with the polarity reversal, between the left eye image and the right eye image is to be used as a compensation image, and the other of the left eye image or the right eye image is a non-compensation image, the reference gamma data generator generates reference gamma data according to the lookup table for the 2-dimensional image in order to compensate for a charging rate of the image for the compensation.

The reference gamma data generator may include a selector configured to select a lookup table, other than the lookup table for the 2-dimensional image and the lookup table for the 3-dimensional image, an output unit configured to output the lookup table selected by the selector, an OR logic circuit unit configured to receive the glasses synchronization signal and the option signal, and an AND logic circuit unit configured to receive an output of the OR logic circuit unit and a 3-dimensional image display selection signal, and to output the received output of the OR logic circuit unit and 3-dimensional image display selection signal to the selector.

The reference gamma data generator may be configured to generate the reference gamma data by selecting the lookup table for the 2-dimensional image when a 2-dimensional image is displayed, select the lookup table for the 2-dimensional image to generate the reference gamma data, when a 3-dimensional image is displayed and the image for the compensation is displayed, and select the lookup table for the 3-dimensional image to generate the reference gamma data when the 3-dimensional image is displayed and the non-compensation image is displayed.

When the 3-dimensional image is applied at 120 Hz, the left eye image and the right eye image are alternately applied. When the 3-dimensional image is applied at 240 Hz, the left eye image, the left eye image, the right eye image, and the right eye image are alternately applied, or the left eye image, a black image, the right eye image, and the black image are alternately applied.

The reference gamma data generator may include one lookup table for a 2-dimensional image and a first lookup table for the 3-dimensional image and a second lookup table for the 3-dimensional image, which are two lookup tables for a 3-dimensional image, and the signal controller uses a lookup table, selected between the two lookup tables for the 3-dimensional image of the reference gamma data generator which are different between the left eye image and the right eye image, based on the glasses synchronization signal.

A polarity of the data voltage applied to the display panel may be reversed for each predetermined frame, and when an image applied, together with the polarity reversal between the left eye image and the right eye image is referred to as a compensation image and the other of the left eye image and the right eye image is a non-compensation image, the reference gamma data generator generates: reference gamma data according to the first lookup table for the 3-dimensional image in order to compensate for a charging rate of the non-compensation image, and reference gamma data according to the second lookup table for the 3-dimensional image in order to compensate for a charging rate of the compensation image.

The reference gamma data generator may include a selector configured to select a lookup table, other than the lookup table or the 2-dimensional image and the two lookup tables for the 3-dimensional image, an output unit configured to output the lookup table selected by the selector, an OR logic circuit unit configured to receive the glasses synchronization signal and the option signal, and an AND logic circuit unit configured to receive an output of the OR logic circuit unit and a 3-dimensional image display selection signal, and to output the received output of the OR logic circuit unit and 3-dimensional image display selection signal to the selector.

The reference gamma data generator may be configured to generate the reference gamma data by selecting the lookup table for the 2-dimensional image when a 2-dimensional image is displayed, select the second lookup table for the 3-dimensional image to generate the reference gamma data when the 3-dimensional image is displayed and the compensation image is displayed, and select the first lookup table for the 3-dimensional image to generate the reference gamma data when the 3-dimensional image is displayed and the non-compensation image is displayed.

When the 3-dimensional image is applied at 120 Hz, the left eye image and the right eye image are alternately applied, and when the 3-dimensional image is applied at 240 Hz, the left eye image, the left eye image, the right eye image, and the right eye image are alternately applied, or the left eye image, a black image, the right eye image, and the black image are alternately applied.

The signal controller may include an ACC unit configured to correct the image data input from the outside considering a gamma characteristic of each color, and the ACC unit includes one ACC lookup table for a 2-dimensional image, a first ACC lookup table for the 3-dimensional image, and a second ACC lookup table for the 3-dimensional image, and the signal controller uses an ACC lookup table, selected between the two ACC lookup tables for the 3-dimensional image of the ACC unit which are different between the left eye image and the right eye image, based on the glasses synchronization signal.

A polarity of the data voltage applied to the display panel may be reversed for predetermined frames, and when an image applied, together with the polarity reversal between the left eye image and the right eye image as a compensation image and the other of the left eye image and the right eye image is a non-compensation image: the ACC unit corrects the image data according to the first ACC lookup table for the 3-dimensional image in order to compensate for a charging rate of the non-compensation image, and the ACC unit corrects the image data according to the second ACC lookup table for the 3-dimensional image in order to compensate for a charging rate of the compensation image.

The ACC unit may include a selector configured to select a lookup table, other than the ACC lookup table for the 2-dimensional image and the two ACC lookup tables for the 3-dimensional image, an output unit configured to output the lookup table selected by the selector, an OR logic circuit unit configured to receive the glasses synchronization signal and the option signal, and an AND logic circuit unit configured to receive an output of the OR logic circuit unit and a 3-dimensional image display selection signal, and output the received output of the OR logic circuit unit and 3-dimensional image display selection signal to the selector.

The ACC unit may correct the image data by selecting the ACC lookup table for the 2-dimensional image when the 2-dimensional image is displayed, selects the second ACC lookup table for the 3-dimensional image to correct the image data when the 3-dimensional image is displayed and the compensation image is displayed, and selects the first ACC lookup table for the 3-dimensional image to correct the image data when the 3-dimensional image is displayed and the non-compensation image is displayed.

When 3-dimensional image is applied at 120 Hz, the left eye image and the right eye image are alternately applied, and when the 3-dimensional image is applied at 240 Hz, the left eye image, the left eye image, the right eye image, and the right eye image are alternately applied, or the left eye image, a black image, the right eye image, and the black image are alternately applied.

The signal controller may include a DCC unit configured to correct the image data output from the ACC unit in order to improve a response speed of the display panel.

The reference gamma data generator may include the lookup table for the 2-dimensional image and the lookup table for the 3-dimensional image, and the reference gamma data generator generates reference gamma data using the lookup table for the 2-dimensional image when the 2-dimensional image is displayed, and generates reference gamma data using only the lookup table for the 3-dimensional image when the 3-dimensional image is displayed.

The reference gamma data generated by the reference gamma data generator may be transmitted to the gray voltage generator, and the reference gamma data transferred between the reference gamma data generator and the gray voltage generator is a digital signal.

In accordance with another embodiment, a controller for a 3-dimensional image display device includes a reference gamma data generator to correct image data; a gray voltage generator to generate a gray voltage based on the corrected image output from the reference gamma data generator; and a signal controller to control a display panel to display left-eye and right-eye images based on the gray voltage output from the gray voltage generator, and to control glasses including a left-eye lens and a right-eye lens based on a glasses synchronization signal, wherein the signal controller compensates for charging rates of the left-eye and right-eye images based on the glasses synchronization signal.

BRIEF DESCRIPTION OF THE DRAWINGS

Features will become apparent to those of ordinary skill in the art by describing in detail exemplary embodiments with reference to the attached drawings in which:

FIG. 4 illustrates an example of operating characteristics of the reference gamma data generator;

FIG. 8 illustrates another example of operating characteristic of a reference gamma data generator;

FIG. 13 illustrates another example of operating characteristics of an ACC unit.

DETAILED DESCRIPTION

Figure 1:
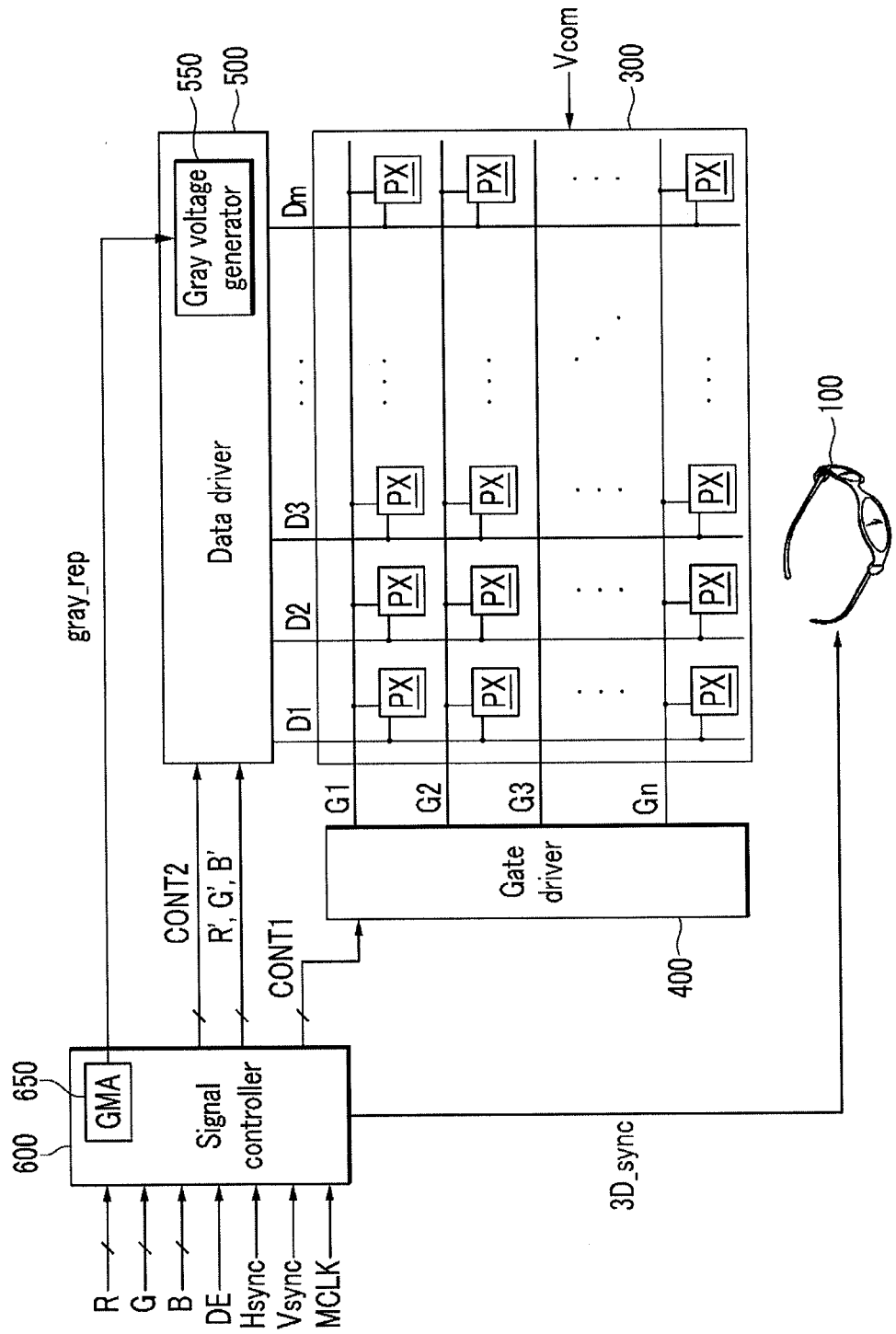
FIG. 1 illustrates an embodiment of a 3-dimensional image display device.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates an embodiment of a 3-dimensional image display device which includes glasses 100 which a user wears to view a 3-dimensional image. The display device also includes a display panel 300 for displaying an image, a data driver 500 and a gate driver 400 for driving the display panel 300, and a signal controller 600 for controlling the data driver 500 and the gate driver 400. The display panel 300 may be a liquid crystal display panel or another type of panel. For illustrative purposes, the display panel will be assumed to be a liquid crystal display panel.

The liquid crystal display panel 300 includes a plurality of gate lines G1 to Gn and a plurality of data lines D1 to Dm. The plurality of gate lines G1 to Gn may extend in a horizontal direction, and the plurality of data lines D1 to Dm may extend in a vertical direction crossing the plurality of gate lines G1 to Gn. One gate line G1 to Gn and one data line D1 to Gm are connected with one pixel.

Each pixel may include a switching element Q connected with the gate line G1 to Gn and the data line D1 to Dm. A control terminal of the switching element Q is connected with the gate line G1 to Gn, an input terminal is connected with a data line D1 to Dm, and an output terminal is connected with a pixel electrode. The pixel electrode forms one end of a liquid crystal capacitor. According to one embodiment, one pixel may include two or more sub pixels. In this case, the sub pixels may have the separate pixel electrodes, respectively. Further, the respective sub pixels may have separate switching elements Q or may have a common switching element Q.

The liquid crystal display panel 300 may display a 3-dimensional image and a 2-dimensional image. The 3-dimensional image is divided into a left eye image and a right eye image for each frame to be displayed. As a result, the 3-dimensional image is driven at a higher frequency than that of the 2-dimensional image. In one embodiment, the 2-dimensional image is displayed at 60 Hz, and the 3-dimensional image is displayed at 120 Hz or 240 Hz. The display frequency may be different in other embodiments. A 3-dimensional image frequency for displaying the 3-dimensional image and a 2-dimensional image frequency for displaying the 2-dimensional image may be controlled to operate at predetermined frequencies by the signal controller 600.

The signal controller 600 responds to image data R, G, and B and control signals of the image data R, G, and B. For example, the control signals may include a vertical synchronization signal Vsync, a horizontal synchronization signal Hsync, a main clock signal MCLK, and a data enable signal DE. The control signals may be received from an external source and may be used to appropriately process the image data R, G, and B. The signal controller 600 may use the control signals in accordance with an operation condition of the liquid crystal display panel 300.

The signal controller 600 may then generate and output image data R', G', and B', a gate control signal CONT1, a data control signal CONT2, and a clock signal. In addition, the signal controller 600 may include a reference gamma data generator (GMA) 650 for generating reference gamma data gray_rep.

In one embodiment, the reference gamma data generator 650 generates a plurality of reference gamma data gray_rep, and transmits the generated reference gamma data gray_rep to a gray voltage generator 550 within or coupled to the data driver 500. When values of the reference gamma data gray_rep change, values of gray voltages generated by the gray voltage generator 550 change. As a result, even though the gray data input from the external source are the same, the values of the data voltages transmitted to the liquid crystal display panel 300 may actually be different.

To this end, the reference gamma data generator 650 may include a plurality of lookup tables LUT. The value of the generated and output reference gamma data gray_rep may change by changing the lookup table LUT. In one embodiment, the reference gamma data generator 650 of the display device displaying the 3-dimensional image and the 2-dimensional image may include a lookup table for the 2-dimensional image (see 2D GMA LUT of FIG. 3), and a lookup table for the 3-dimensional image (see 3D GMA LUT of FIG. 3). The lookup table for the 2-dimensional image or the 3-dimensional image may include one or more lookup tables. Also, in one embodiment, the reference gamma data gray_rep output from the reference gamma data generator

650 may be a digital signal and may be transmitted to the gray voltage generator 550 of the data driver 500 by various digital signal input/output methods.

The gate control signal CONT1 includes a vertical synchronization start signal STV (hereinafter, referred to as an "STV signal") instructing an output start of a gate on pulse (a high section of a gate signal GS), and a gate clock signal CPV (hereinafter, referred to as a "CPV signal") controlling an output time of the gate on pulse.

The data control signal CONT2 includes a horizontal synchronization start signal STH instructing an input start of the image data R', G', and B', and a load signal TP instructing an application of corresponding data voltages to the data lines D1 to Dm.

The signal controller 600 outputs a glasses synchronization signal 3D_sync for turning on/off a left lens and a right lens of the glasses 100 in accordance with a display image of the liquid crystal display panel 300 to synchronize the glasses 100.

The plurality of gate lines G1 to Gn of the liquid crystal display panel 300 is connected with the gate driver 400. The gate driver 400 alternately applies a gate-on voltage Von and a gate-off voltage Voff to the gate lines G1 to Gn according to the gate control signal CONT1 applied from the signal controller 600.

The plurality of data lines D1 to Dm of the liquid crystal display panel 300 is connected with the data driver 500. The data driver 500 receives the data control signal CONT2 and the image data R', G', and B' from the signal controller 600. The data driver 500 converts the image data R', G', and B' to data voltages using analog gray voltages generated in the gray voltage generator 550. The converted data voltages are transmitted to the data lines D1 to Dm.

As previously indicated, in one embodiment, the gray voltage generator 550 may be positioned within the data driver 500 to receive the reference gamma data gray_rep, which is the digital signal of the reference gamma data generator 650 formed inside the signal controller 500. The gray voltage generator 550 may generate a gray voltage according to the received reference gamma data gray_rep. The reference gamma data gray_rep generates only values (the reference gamma data of one set) for representative some grays among the entire grays to transmit the generated values to the gray voltage generator 550. Thus the gray voltages of one set are generated. The one set of generated gray voltages is used for changing the image data R', G', and B' to the data voltages within the data driver 500.

In one embodiment, the gray voltage generator 550 may be formed as a partial circuit within the data driver 500 attached to an external side of the display panel 300 in a form of an integrated circuit or a chip. In this case, the data driver 500 does not receive an analog voltage from the external source but receives only a digital signal, to thereby generate the data voltage which is an analog voltage. To this end, the reference gamma data generator 650 generating the reference gamma data gray_rep, which is the digital signal, is positioned inside the signal controller 500.

When the switching element Q of each pixel PX of the liquid crystal display panel 300 is turned on, the data voltage is charged in the liquid crystal capacitor. A positive data voltage and a negative data voltage of the data voltage are alternately applied according to an inversion driving by various methods. In this case, since the left eye image and the right eye image are alternately displayed when the 3-dimensional image is displayed, a difference of charging rates between the left eye image and the right eye image is generated. As a result, a difference of displayed luminance is generated, and the user may also view the luminance difference as a flicker.

That is, the left eye image or the right eye image, applied while the polarity is reversed from a minus polarity to a plus polarity, does not have sufficient charging time, so that a charging rate deteriorates. Accordingly, the left eye image or the right eye image applied together with the reverse signal may be compensated by a deteriorating charging rate, referred to as a compensation image.

In the meantime, the left eye image or the right eye image, which is not the compensation image, is referred to as an image for non-compensation. The image for compensation and the image for non-compensation may one-to-one correspond to the divided left eye image and right eye image. That is, in when the compensation image is the left eye image, the non-compensation image is the right eye image. When the non-compensation image is the left eye image, the compensation image is the right eye image.

In one embodiment described below, left eye the image may be applied together with the polarity reversal. Accordingly, at least one embodiment may be described in which the compensation image is the left eye image and non-compensation image is the right eye image. Also, in one embodiment, in order to compensate for the difference of the charging rate, the lookup table used by the reference gamma data generator 650 may be changed. This will be described in detail with reference to FIG. 2.

Figure 2:
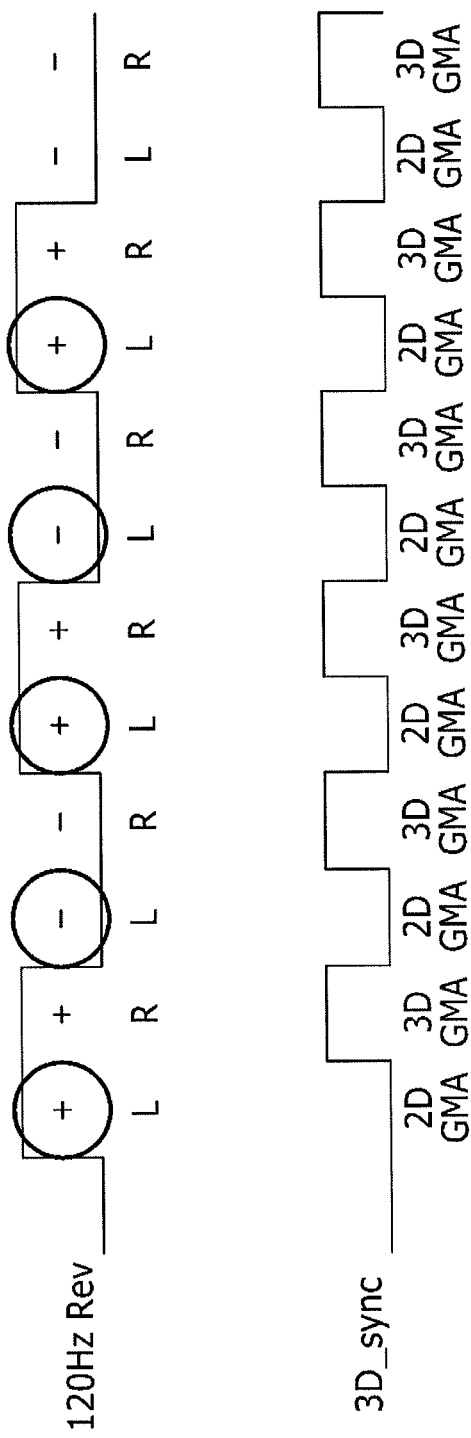
FIG. 2 illustrates a waveform for a 3-dimensional image display device.

FIG. 2 illustrates a waveform for a 3-dimensional image display device including a polarity reverse signal (Rev) and a glasses synchronization signal (3D_sync), corresponding to the exemplary case where the liquid crystal display panel 300 displays a 3-dimensional image at 120 Hz.

When the 3-dimensional image is displayed at 120 HZ, a left eye image L is displayed and then a right eye image R is displayed. In other embodiments, the order of displaying the L and R images may be changed. Also, the polarity reversal signal Rev is a signal applied for reversing a polarity of the data voltage for each predetermined frame. The predetermined frame may be a minimum of one frame to several frames less than a predetermined number, e.g., 10.

Considering the polarity reversal signal Rev together, the left eye image L may always be applied while the polarity of the data voltage is changed as indicated by a circle in FIG. 2. That is, since the left eye image L is applied in a state where the data voltage having an opposite polarity is applied to the liquid crystal capacitor of the pixel, the liquid crystal capacitor cannot help but have a relatively low charging rate per hour.

In contrast, since the right eye image R is always applied in a state where the polarity of the data voltage is maintained, the right eye image R has a high charging rate per hour for the liquid crystal capacitor compared to the left eye image L. The difference of the charging rates may have a problem of making the images have different display luminance even when the same gray is desired to be displayed. This also may make the user view the display luminance difference as a flicker. When the right eye image R is first applied and the left eye image L is applied thereafter, the charging rate of the left eye image L is relatively high.

In order to overcome this problem, in one embodiment, the display luminance of the two images is compensated so that the flicker is not viewed. This may be accomplished by changing the lookup table used by the reference gamma data generator 650 within the signal controller 600 using the glasses synchronization signal 3D_sync.

In the exemplary embodiment of FIG. 2, the reference gamma data generator 650 has two lookup tables, which may be a lookup table 2D GMA LUT for the 2-dimensional image and a lookup table 3D GMA LUT for the 3-dimensional image.

When the glasses synchronization signal 3D_sync has a low level, the lookup table 2D GMA LUT for the 2-dimensional image may be selected and the left lens of the glasses 100 may be opened. When the glasses synchronization signal 3D_sync has a high level, the lookup table 3D GMA LUT for the 3-dimensional image may be selected and the right lens of the glasses 100 may be opened. That is, even when the 3-dimensional image is displayed, the lookup table for displaying the 2-dimensional image is used, thereby compensating for the charging rate.

In the embodiment of FIG. 2, a cycle of the polarity reverse signal Rev is two times compared to the glasses synchronization signal 3D_sync, and a frequency thereof is a half of that of the glasses synchronization signal 3D_sync. That is, since the polarity reverse signal Rev has a frequency of 120 Hz, a frequency of the glasses synchronization signal 3D_sync is 240 Hz.

Further, it is illustrated in FIG. 2 that a level change timing, at which the polarity reverse signal Rev is changed from the high level to the low level or from the low level to the high level, partially matches a level change timing of the glass synchronization signal 3D_sync. However, depending on the exemplary embodiment, the level change timing of the polarity reverse signal Rev may not match the level change timing of the glasses synchronization signal 3D_sync.

In displaying the 3-dimensional image as illustrated in FIG. 2, in order to compensate for the difference of the charging rates between the left eye image and the right eye image, the value of the data voltage generated by transmitting the plurality of different reference gamma data to the gray voltage generator 550 of the data driver 500 is changed by changing the lookup table used in the reference gamma data generator 650. As a result, the charging rates of the left eye image and the right eye image are compensated, so that the user does not view flicker. In this case, the glasses synchronization signal 3D_sync is used.

Figure 3:
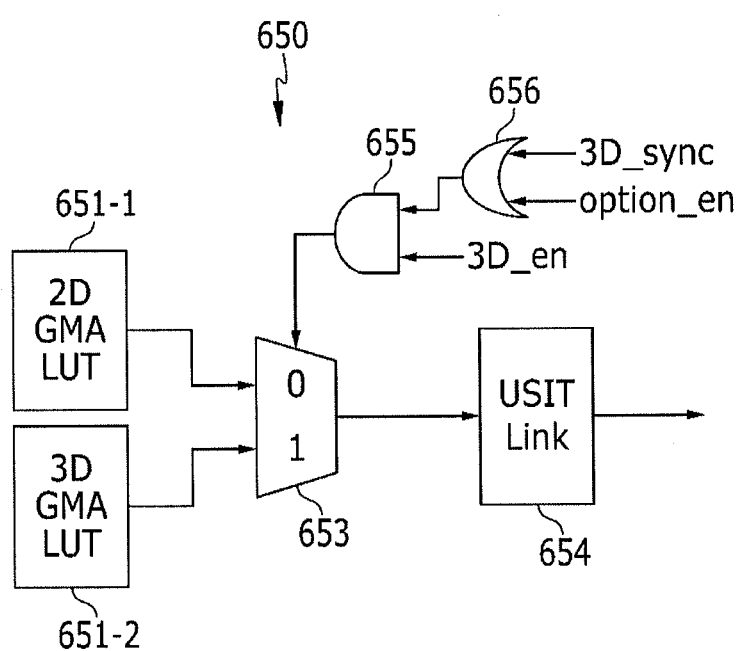
FIG. 3 illustrates an embodiment of a reference gamma data generator.

FIG. 3 illustrates an embodiment of the reference gamma data generator 650 of the 3-dimensional image display device. The reference gamma data generator 650 illustrated in FIG. 3 may be positioned within the signal controller 600, and may generate the reference gamma data by using the two lookup tables 2D GMA LUT and 3D GMA LUT.

The reference gamma data generator 650 includes two lookup tables 651-1 and 651-2, a selector 653, an output unit 654, an OR logic circuit unit 656, and an AND logic circuit unit 655.

A signal input to the reference gamma data generator 650 may include a 3-dimensional image display selection signal 3D_en, an option signal option_en, and the glasses synchronization signal 3D_sync.

When the 3-dimensional image is displayed, 1 (high value) is input as the 3-dimensional image display selection signal 3D_en. When the 2-dimensional image is displayed, 0 (low value) is input as the 3-dimensional image display selection signal 3D_en.

Further, when the 2-dimensional image is displayed, any signal is not input as the option signal option_en, But, when the 3-dimensional image is displayed and it is time to change the reference gamma data, 0 is input as the option signal option_en. Also, when the reference gamma data is not changed, 1 is input as the option signal option_en.

When the 3-dimensional image is displayed by the option signal option_en, the reference gamma data generator 650 may determine whether to output the reference gamma data, while alternately changing the reference gamma data or outputting only the plurality of non-changed reference gamma data, even though the 3-dimensional image is displayed.

When the glasses synchronization signal 3D_sync and the option signal option_en are input to the OR logic circuit unit 656, and the value of 1 is input as any one of the two signals, 1 is transmitted to the AND logic circuit unit 655. When both the output of the OR logic circuit unit 656 and the 3-dimensional image display selection signal 3D_en have the value of 1, the AND logic circuit unit 655 outputs the value of 1 to the selector 653. When the value input to the selector 653 is 1, the 3D GMA LUT 651-2 is selected. When the value input to the selector 653 is 0, or any signal is not input to the selector 653 because the AND logic circuit unit 655 has no output signal, the 2D GMA LUT 651-1 is selected.

FIG. 4 is a table illustrating operating characteristics of the reference gamma data generator. In FIG. 4, the symbol "x" represents a case having no corresponding signal.

The first row in FIG. 4 illustrates a case in which the 2-dimensional image is displayed. In this case, the option signal option_en is not used and the glasses 100 need not to be used, so that the 2D GMA LUT 651-1, which is the basic lookup table displaying the 2-dimensional image, is selected and used.

The second row is a case in which the 3-dimensional image is displayed. In this case, the reference gamma data does not needs to be changed by the option signal option_en, so that the 3D GMA LUT 651-2, which is the basic lookup table displaying the 3-dimensional image, is selected and used.

The third row is a case in which the 3-dimensional image is displayed and the reference gamma data needs to be changed by the option signal option_en. In this case, the right lens is opened by the glasses synchronization signal 3D_sync, so that the 3D GMA LUT 651-2, which is basically used in the display of the 3-dimensional image, is selected and used.

The fourth row is a case in which the 3-dimensional image is displayed, and the reference gamma data needs to be changed by the option signal option_en. In this case, the left lens is opened by the glasses synchronization signal 3D_sync, so that 2D GMA LUT 651-1, which is not basically selected and used in the display of the 3-dimensional image, is selected and used in order to compensate for a loss of the charging rate due to the inversion driving.

Depending on the embodiment, instead of the glasses synchronization signal 3D_sync used in FIGS. 3 and 4, a signal having the same cycle and same waveform as those of the glasses synchronization signal 3D_sync, but different from the glasses synchronization signal 3D_sync by a predetermined time, may be used. Use of the signal may decrease crosstalk that arises when the left eye image is applied to the right eye of the user, or the right eye image is applied to the left eye. This may be accomplished by adjusting a lens on/off time of the eyeglasses and a time for displaying the image by the liquid crystal display panel 300. In this case, a slight delay may occur and input to the glasses synchronization signal 3D_sync input to the OR logic circuit unit 656 of FIG. 3, and the reference gamma data generator 650 may further include an additional delay.

When the 3-dimensional image is displayed at 120 Hz has been described with reference to FIGS. 2 to 4. However, a 3-dimensional image may be displayed at 240 Hz as illustrated in FIG. 5 depending on the exemplary embodiment, which will be described with reference to FIG. 5.

Figure 5:
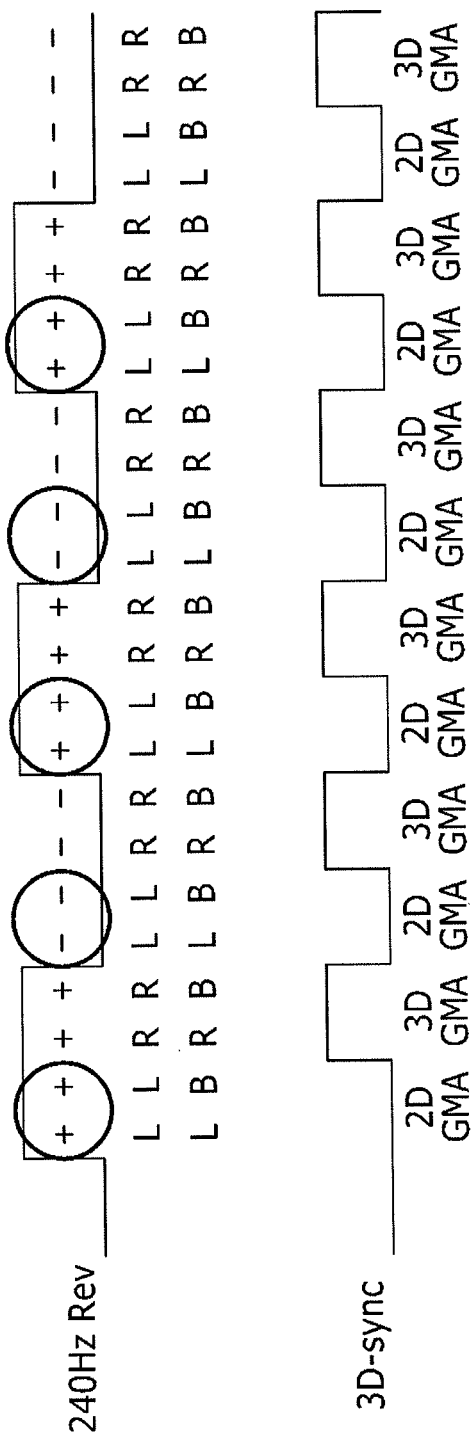
FIG. 5 illustrates another waveform for a 3-dimensional image display device.

FIG. 5 illustrates a waveform for a 3-dimensional image display device according to another embodiment. This waveform has no difference in the polarity reverse signal Rev and the glasses synchronization signal 3D_sync when being compared with that of FIG. 2. That is, the polarity reverse signal Rev has a frequency of 120 Hz, and the glasses synchronization signal 3D_sync has a frequency of 240 Hz.

However, the image applied to the liquid crystal display panel 300 may be applied at 240 Hz. The images may be applied to the liquid crystal display panel 300 in an order from the left eye image L, the left eye image L, the image right eye R, to the right eye image R, or an order from the left eye image L, a black image B, the right eye image R, to the black image B.

Even in the exemplary embodiment of FIG. 5, the left eye image L starts to be applied while a polarity thereof is changed. As a result, the charging rate of the left eye image L is decreased compared to the right eye image R. In order to compensate for the decreased charging rate, the exemplary embodiment of FIGS. 3 and 4 may be applied. The polarity reversal signal Rev and the glasses synchronization signal 3D_sync used in FIG. 5 have no difference from those of the exemplary embodiment of FIG. 2, so that the exemplary embodiment of FIGS. 3 and 4 may be applied as it is.

Figure 6:
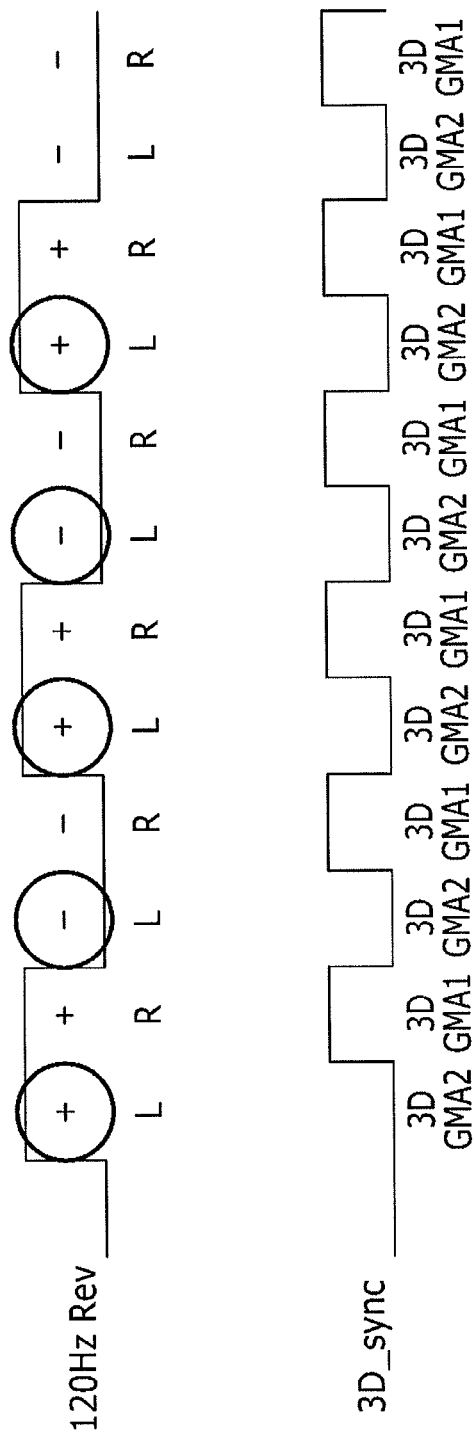
FIG. 6 illustrates another waveform for a 3-dimensional image display device.
Figure 7:
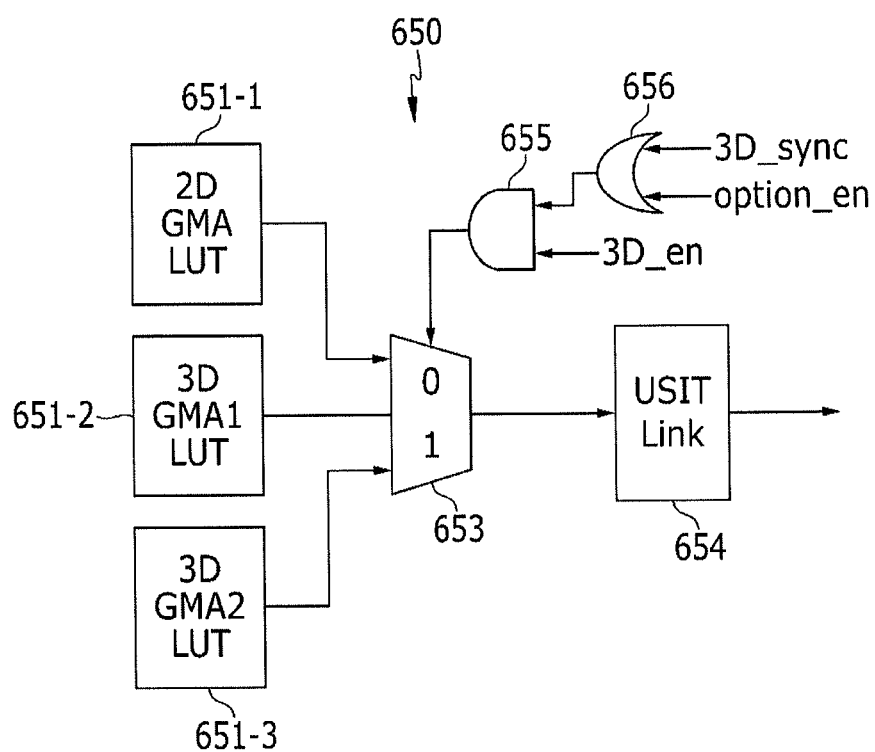
FIG. 7 illustrates another embodiment of a reference gamma data generator.

FIGS. 6 to 8 illustrate an embodiment in which the 3-dimensional image of 120 Hz is displayed, the reference gamma data generator 650 has one lookup table 2D GMA LUT for the 2-dimensional image, and two lookup tables 3D GMA1 LUT and 3D GMA2 LUT for the 3-dimensional image. In contrast to the embodiment of FIGS. 2 to 5, when a 3-dimensional image is displayed in accordance with the embodiment of FIGS. 6 to 8, the lookup table 2D GMA LUT for the 2-dimensional image is not used. Instead, a separate lookup table 3D GMA2 LUT is added and used, thereby achieving an advantage of more accurately compensating for the charging rate.

FIG. 6 illustrates a waveform for a 3-dimensional image display device which includes the polarity reverse signal Rev and the glasses synchronization signal 3D_sync when the liquid crystal display panel 300 displays the 3-dimensional image at 120 Hz.

When the liquid crystal display panel 300 displays a 3-dimensional image at 120 Hz, the left eye image L is displayed and then the right eye image R is displayed. The order may be changed in other embodiments. Considering the polarity reversal signal Rev together, the left eye image L is always applied while the polarity of the data voltage is changed as indicated by a circle in FIG. 6. That is, since the left eye image L is applied in a state where the data voltage having an opposite polarity is applied to the liquid crystal capacitor of the pixel, the liquid crystal capacitor cannot help but have a relatively low charging rate per hour.

In contrast, when the right eye image R is always applied in a state where the polarity of the data voltage is maintained, the right eye image R has a high charging rate per hour for the liquid crystal capacitor compared to the left eye image L. The difference of the charging rates may have a problem of making the images have different display luminance even when the same gray is desired to be displayed. This difference may also allow the user to view the display luminance difference as a flicker. When the right eye image R is first applied and the left eye image L is applied thereafter, the charging rate of the left eye image L is relatively high.

In order to overcome this problem, in one embodiment, the display luminance of the two images is compensated so that the flicker is not viewed. This may be accomplished by changing the lookup table used by the reference gamma data generator 650 within the signal controller 600 by using the glasses synchronization signal 3D_sync.

More specifically, in the embodiment of FIG. 6, the reference gamma data generator 650 has three lookup tables, including one lookup table 2D GMA LUT for the 2-dimensional image and two lookup tables 3D GMA1 LUT and 3D GMA2 LUT for the 3-dimensional image. The first lookup table 3D GMA1 LUT for the 3-dimensional image, among the two lookup tables 3D GMA1 LUT and 3D GMA2 LUT for the 3-dimensional image, may be a basically used lookup table for the 3-dimensional image. The second lookup table 3D GMA2 LUT for the 3-dimensional image may be a lookup table for the 3-dimensional image added for compensating for the charging rate.

When the glasses synchronization signal 3D_sync has a low level, the second lookup table 3D GMA2 LUT for the 3-dimensional image is selected and the left lens of the glasses 100 is opened. When the glasses synchronization signal 3D_sync has a high level, the first lookup table 3D GMA1 LUT for the 3-dimensional image is selected and the right lens of the glasses 100 is opened. That is, even when the 3-dimensional image is displayed, the lookup table for displaying the 2-dimensional image is not used, thereby more precisely compensating for the charging rate.

In FIG. 6, a cycle of the polarity reverse signal Rev is two times the glasses synchronization signal 3D_sync, and a frequency thereof is a half of that of the glasses synchronization signal 3D_sync. That is, since the polarity reverse signal Rev has a frequency of 120 Hz, a frequency of the glasses synchronization signal 3D_sync is 240 Hz.

Further, it is illustrated in FIG. 6 that a level change timing, at which the polarity reverse signal Rev is changed from the high level to the low level or from the low level to the high level, partially matches a level change timing of the glass synchronization signal 3D_sync. However, depending on the exemplary embodiment, the level change timing of the polarity reverse signal Rev may not match the level change timing of the glasses synchronization signal 3D_sync.

In displaying the 3-dimensional image as illustrated in FIG. 6, in order to compensate for the difference of the charging rates between the left eye image and the right eye image, the value of the data voltage generated by transmitting the plurality of different reference gamma data to the gray voltage generator 550 of the data driver 500 is changed by changing the lookup table for the 3-dimensional image used in the reference gamma data generator 650. As a result, the charging rates of the left eye image and the right eye image are compensated, so that the user does not view the flicker. In this case, the glasses synchronization signal 3D_sync is used.

FIG. 7 illustrates an example of the reference gamma data generator for changing the lookup table used by the reference gamma data generator 650 as described in the exemplary embodiment of FIG. 6. As shown, the reference gamma data generator 650 is positioned within the signal controller 600 and generates the reference gamma data by using a total of three lookup tables 2D GMA LUT, 3D GMA1 LUT, and 3D GMA2 LUT.

When displaying the 2-dimensional image, the reference gamma data generator 650 generates the reference gamma data using the lookup table 2D GMA LUT for the 2-dimensional image. When the 3-dimensional image is displayed, the reference gamma data generator 650 generates the reference gamma data by alternately using the two lookup tables 3D GMA1 LUT and 3D GMA2 LUT.

The reference gamma data generator 650 includes three lookup tables 651-1, 651-2, and 651-3, a selector 653, an output unit 654, an OR logic circuit unit 656, and an AND logic circuit unit 655. A signal input to the reference gamma data generator 650 generally includes a 3-dimensional image display selection signal 3D_en, an option signal option_en, and the glasses synchronization signal 3D_sync.

When the 3-dimensional image is displayed, 1 (high value) is input as the 3-dimensional image display selection signal 3D_en. When the 2-dimensional image is displayed, 0 (low value) is input as the 3-dimensional image display selection signal 3D_en.

Further, when the 2-dimensional image is displayed, any signal is not input as the option signal option_en. But, when the 3-dimensional image is displayed and it is time to change the reference gamma data, 0 is input as the option signal option_en. When the reference gamma data is not changed, 1 is input as the option signal option_en. When the 3-dimensional image is displayed by the option signal option_en, the reference gamma data generator 650 may determine whether to output the reference gamma data while alternately changing the reference gamma data or output only the plurality of non-changed reference gamma data even though the 3-dimensional image is displayed.

When the glasses synchronization signal 3D_sync and the option signal option_en are input to the OR logic circuit unit 656, and the value of 1 is input as any one of the two signals, the value of 1 is transmitted to the AND logic circuit unit 655. When both the output of the OR logic circuit unit 656 and the 3-dimensional image display selection signal 3D_en have the value of 1, the AND logic circuit unit 655 outputs the value of 1 to the selector 653.

When the value input to the selector 653 is 1, the first lookup table 3D GMA1 LUT for the 3-dimensional image is selected. When the value input to the selector 653 is 0, the second lookup table 3D GMA2 LUT for the 3-dimensional image is selected. When there is no output signal in the AND logic circuit unit 655, so that any signal is not input to the selector 653, the 2D GMA LUT 651-1 is selected.

FIG. 8 illustrates another example of operating characteristics of the reference gamma data generator. In FIG. 8, the symbol "x" represents no corresponding signal.

The first row in FIG. 8 is a case in which the 2-dimensional image is displayed. In this case, the option signal option_en is not used and the glasses 100 need not to be used. As a result, the 2D GMA LUT 651-1, which is the basic lookup table displaying the 2-dimensional image, is selected and used.

The second row is a case in which the 3-dimensional image is displayed. However, in this case, the reference gamma data does not need to be changed by the option signal option_en. Thus, the first lookup table 3D GMA1 LUT 651-2 for the 3-dimensional image, which is the basic lookup table displaying the 3-dimensional image, is selected and used.

The third row is a case in which the 3-dimensional image is displayed. The reference gamma data needs to be changed by the option signal option_en. In this case, the right lens is opened by the glasses synchronization signal 3D_sync. Thus, the first lookup table 3D GMA1 LUT 651-2 for the 3-dimensional image, which is basically used in the display of the 3-dimensional image, is selected and used.

The fourth row is a case in which the 3-dimensional image is displayed. The reference gamma data needs to be changed by the option signal option_en. In this case, the left lens is opened by the glasses synchronization signal 3D_sync. Thus, the second lookup table 3D GMA2 LUT 651-3 for the 3-dimensional image, which is additionally included in the display of the 3-dimensional image, is selected and used in order to compensate for the loss of the charging rate due to the inversion driving.

Depending on the embodiment, instead of the glasses synchronization signal 3D_sync used in FIGS. 7 and 8, a signal having the same cycle and same waveform as those of the glasses synchronization signal 3D_sync, but being different from the glasses synchronization signal 3D_sync by a predetermined time, may be used. Use of the signal may decrease crosstalk when the left eye image is applied to the right eye of the user or the right eye image is applied to the left eye. This may be accomplished by adjusting a lens on/off time of the glasses and a time for displaying the image by the liquid crystal display panel 300. In this case, a slight delay may be provided and input to the glasses synchronization signal 3D_sync input to the OR logic circuit unit 656 of FIG. 7. The reference gamma data generator 650 may further include an additional delay.

Previously, the 3-dimensional image has been disclosed as being displayed at 120 Hz with reference to FIGS. 6 to 8. However, the 3-dimensional image may be displayed at 240 Hz as illustrated in FIG. 9.

Figure 9:
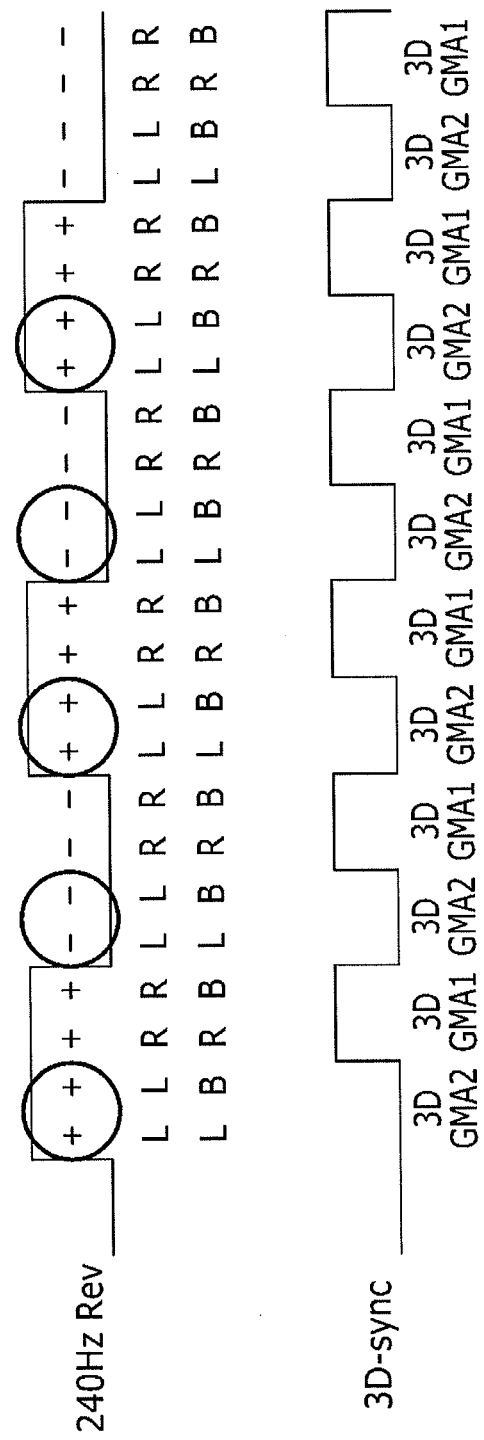
FIG. 9 illustrates another waveform for a 3-dimensional image display device.

FIG. 9 illustrates another waveform of a 3-dimensional image display device. This waveform has no difference in the polarity reverse signal Rev and the glasses synchronization signal 3D_sync when compared with that of FIG. 6. That is, the polarity reverse signal Rev has a frequency of 120 Hz, and the glasses synchronization signal 3D_sync has a frequency of 240 Hz. However, the image applied to the liquid crystal display panel 300 may be applied at 240 Hz, and the images may be applied to the liquid crystal display panel 300 in an order from the left eye image L, the left eye image L, the right eye image R, to the right eye image R, or an order from left eye the image L, a black image B, the right eye image R, to the black image B.

Even in the exemplary embodiment of FIG. 9, the left eye image L starts to be applied while a polarity thereof is changed. As a result, a charging rate of the left eye image L is decreased compared to the right eye image R. In order to compensate for the decreased charging rate, the exemplary embodiment of FIGS. 7 and 8 may be applied. Also, the polarity reversal signal Rev and the glasses synchronization signal 3D_sync used in FIG. 9 may be the same as those of the exemplary embodiment of FIG. 6, so that the exemplary embodiment of FIGS. 7 and 8 may be applied as it is.

The compensation for the difference of the charging rates generated in displaying the 3-dimensional image may be applied to correct the image data R, G, and B to the image data R', G', and B' within the signal controller 600 without changing the reference gamma data. A simple structure of the signal controller 600 according to the exemplary embodiment will be described with reference to FIG. 10.

Figure 10:
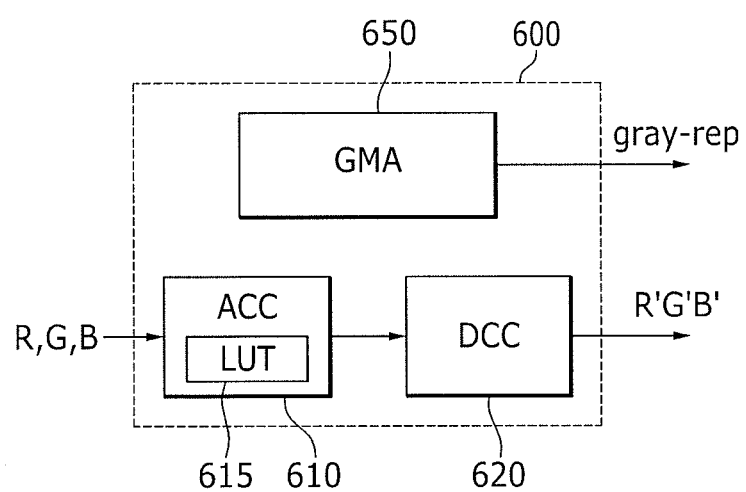
FIG. 10 illustrates an embodiment of a signal controller of a 3-dimensional image display device.

FIG. 10 illustrates an embodiment of a signal controller of the 3-dimensional image display device. In FIG. 10, only the signal controller 600 in the 3-dimensional image display device of FIG. 1, and the configurations, other than the signal controller 600, of the 3-dimensional image display device according to the exemplary embodiment of the present invention may be the same as those of FIG. 1.

As shown in FIG. 10, the signal controller 600 includes a reference gamma data generator GMA 650 for generating reference gamma data gray_rep, and an adaptive color correction (ACC) unit 610 and a dynamic capacitance compensation (DCC) unit 620. The ACC unit 610 and the DCC unit 620 correct image data R, G, and B in accordance with one or more operating characteristics of the display device. The image data R', G', and B' corrected by the ACC unit 610 and the DCC unit 620 is transmitted to the data driver 500.

First, the reference gamma data generator 650 generates a plurality of reference gamma data gray_rep, and transmits the generated reference gamma data gray_rep to the gray voltage generator 550 within the data driver 500. The reference gamma data generator 650 according to the exemplary embodiment of FIG. 10 includes two lookup tables LUT, that is, the lookup table 2D GMA LUT for the 2-dimensional image used for displaying the 2-dimensional image and the lookup table 3D GMA LUT for the 3-dimensional image used for displaying the 3-dimensional image. Further, in contrast to the embodiment of FIGS. 2 to 5, the lookup table 2D GMA LUT for the 2-dimensional image is not used. Rather, only the lookup table 3D GMA LUT for the 3-dimensional image is used when the 3-dimensional image is displayed.

The ACC unit 610 assists in correcting the image data R, G, and B for each color in accordance with one or more display characteristics of the display device for the input image data R, G, and B. The image data R, G, and B are corrected in consideration of even a gamma characteristic of each color. In this case, the image data R, G, and B are corrected by using an ACC lookup table LUT 615.

In the exemplary embodiment, the ACC lookup table 615 is divided into a lookup table for the 2-dimensional image and a lookup table for the 3-dimensional image. The ACC lookup table 615 for the 3-dimensional image may include a first ACC lookup table 3D ACC1 LUT for the basic 3-dimensional image used for displaying the 3-dimensional image, and a second ACC lookup table 3D ACC2 LUT for the 3-dimensional image in which data stored in the lookup table is additionally corrected and stored in order to compensate for even the amount of charging. As a result, the difference of the amount of charging generated when the 3-dimensional image is displayed may be compensated. In the meantime, when the 2-dimensional image is displayed, the ACC lookup table 2D ACC LUT for the 2-dimensional image for displaying the 2-dimensional image in the ACC lookup table 615 is used.

The image data compensated by the ACC unit 610 is input to the DCC unit 620. The DCC unit 620 compares the compensated image data with the image data of an existing frame and generates corrected image data according to the comparison in order to improve a response speed of the display device. The response speed of the display device is advantageously increased by the data correction by the DCC unit 620.

The image data corrected by the DCC unit 620 may be subjected to various additional processes depending on the exemplary embodiment. The processed image data may then be output as corrected image data R', G', and B' to the data driver 500.

That is, the values of the plurality of reference gamma data gray_rep include the values of the reference gamma data gray_rep of each of the 2-dimensional image and the 3-dimensional image. However, when the 3-dimensional image, only one set of the reference gamma data gray_rep is used and the value of the reference gamma data gray_rep is not changed. Instead, the charging rate is compensated in the ACC lookup table 615 used by the ACC unit 610 when the 3-dimensional image is displayed. When the 2-dimensional image is displayed, the ACC lookup table 615 converts the image data R, G, and B by using the ACC lookup table 2D ACC LUT for the 2-dimensional image for displaying the 2-dimensional image by the ACC lookup table 615.

When the 3-dimensional image is displayed, the difference of the charging rates between the left eye image and the right eye image is compensated using the first ACC lookup table 3D ACC1 LUT and the second ACC lookup table 3D ACC2 LUT for the 3-dimensional image.

An exemplary embodiment in which the charging rate of the 3-dimensional image is compensated by using the ACC unit 610 within the signal controller 600 will be described with reference to FIGS. 11 to 13.

Figure 11:
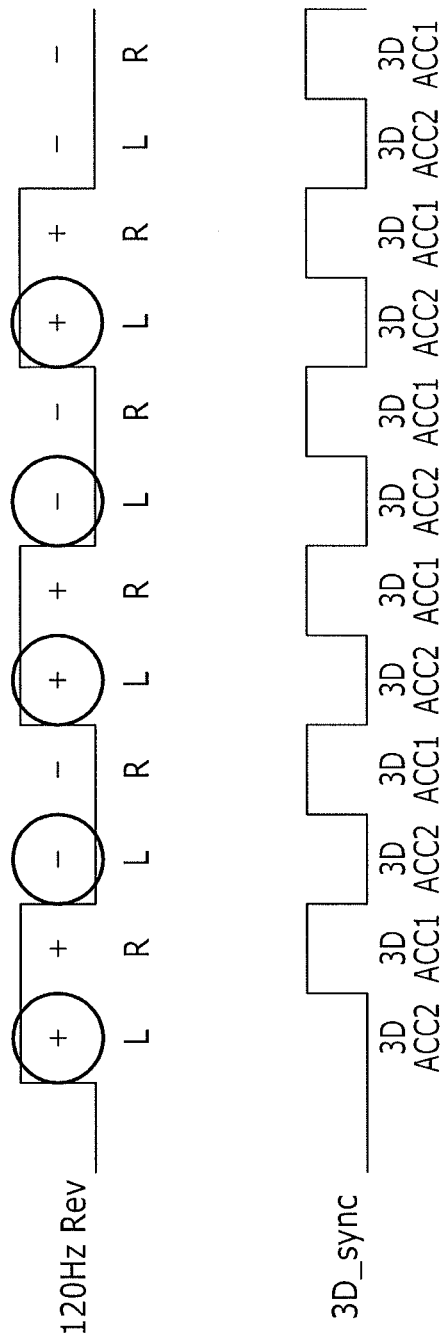
FIG. 11 illustrates another waveform for a 3-dimensional image display device.
Figure 12:
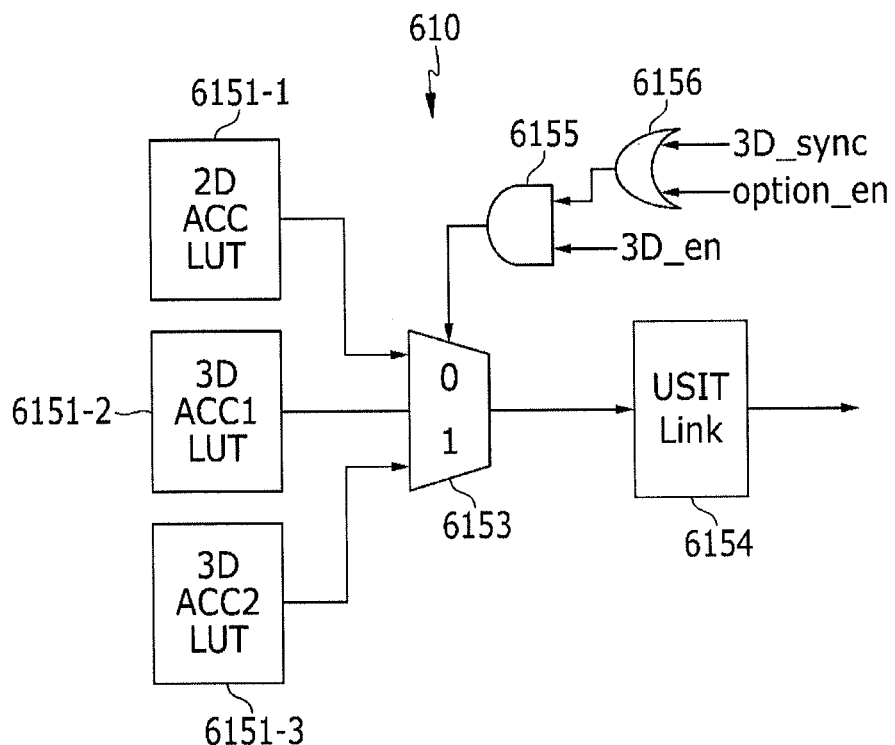
FIG. 12 illustrates an embodiment of an ACC unit in a signal controller.

FIGS. 11 to 13 illustrate the exemplary embodiment in which the ACC unit 610 of the signal controller 600 has one ACC lookup table 2D ACC LUT for the 2-dimensional image, and two ACC lookup tables for the 3-dimensional image (the first ACC lookup table 3D ACC1 LUT and the second ACC lookup table 3D ACC2 LUT for the 3-dimensional image) while displaying the 3-dimensional image at 120 Hz. A waveform will be described in detail with reference to FIG. 11.

FIG. 11 illustrates the polarity reverse signal Rev and the glasses synchronization signal 3D_sync when the liquid crystal display panel 300 displays the 3-dimensional image at 120 Hz. When the liquid crystal display panel 300 displays a 3-dimensional image at 120 Hz, the left eye image L is displayed and then the right eye image R is displayed. The order may be changed in other embodiments.

Considering the polarity reversal signal Rev together, the left eye image L is always applied while the polarity of the data voltage is changed as indicated by a circle in FIG. 11. That is, since the left eye image L is applied in a state where the data voltage having an opposite polarity is applied to the liquid crystal capacitor of the pixel, the liquid crystal capacitor cannot help but have a relatively low charging rate per hour.

In contrast, since the right eye image R is always applied in a state where the polarity of the data voltage is maintained, the right eye image R has a high charging rate per hour for the liquid crystal capacitor compared to the left eye image L. The difference of the charging rates may have a problem of making the images have different display luminance, even when the same gray is desired to be displayed. Also, the user may view the display luminance difference as a flicker in these circumstances. When the right eye image R for is first applied and the left eye image L is applied thereafter, the charging rate of the left eye image L is relatively high.

In order to overcome this problem, in an exemplary embodiment, the display luminance of the two images is compensated so that flicker is not viewed. This may be accomplished by changing the ACC lookup table 615 used by the ACC unit 610 within the signal controller 600 using the glasses synchronization signal 3D_sync.

In the exemplary embodiment of FIG. 11, the ACC unit 610 has three ACC lookup tables 615, which include one lookup table 2D ACC LUT for the 2-dimensional image, and two lookup tables 3D ACC1 LUT and 3D ACC2 LUT for the 3-dimensional image. The first lookup table 3D ACC1 LUT for the 3-dimensional image is a basically used lookup table for the 3-dimensional image. The second lookup table 3D ACC2 LUT for the 3-dimensional image is an ACC lookup table for the 3-dimensional image added for compensating for the charging rate.

When the glasses synchronization signal 3D_sync has a low level, the second ACC lookup table 3D ACC2 LUT for the 3-dimensional image is selected and the left lens of the glasses 100 is opened. When the glasses synchronization signal 3D_sync has a high level, the first ACC lookup table 3D ACC1 LUT is selected and the right lens of the glasses 100 is opened.

In FIG. 11, a cycle of the polarity reverse signal Rev is two times the glasses synchronization signal 3D_sync, and a frequency thereof is a half of that of the glasses synchronization signal 3D_sync. That is, since the polarity reverse signal Rev has a frequency of 120 Hz, a frequency of the glasses synchronization signal 3D_sync is 240 Hz. Further, it is illustrated in FIG. 11 that a level change timing, at which the polarity reverse signal Rev is changed from the high level to the low level or from the low level to the high level, partially matches a level change timing of the glass synchronization signal 3D_sync. However, depending on the exemplary embodiment, the level change timing of the polarity reverse signal Rev may not match the level change timing of the glasses synchronization signal 3D_sync.

In displaying the 3-dimensional image as illustrated in FIG. 11, in order to compensate for the difference of the charging rates between the left eye image and the right eye image, the values of the image data R', G', and B' transmitted to the data driver 500 are changed and applied by changing the ACC lookup table for the 3-dimensional image used in the ACC unit 610. Also, the value of the data voltage transmitted to the display panel 300 is changed. As a result, the charging rates of the left eye image and the right eye image are compensated, so that the user does not view flicker. In this case, the glasses synchronization signal 3D_sync is used.

FIG. 12 illustrates an example of the ACC unit 610 for changing the ACC lookup table 615 used by the ACC unit 610 in the exemplary embodiment of FIG. 11. As shown in FIG. 12, the ACC unit 610 is positioned within the signal controller 600, and corrects the image data R, G, and B by using a total of three ACC lookup tables 2D ACC LUT, 3D ACC1 LUT, and 3D ACC2 LUT. When displaying the 2-dimensional image, the ACC unit 610 corrects the image data R, G, and B using the ACC lookup table 2D ACC LUT for the 2-dimensional image. When the 3-dimensional image is displayed, the ACC unit 610 corrects the image data R, G, and B by alternately using the two ACC lookup tables 3D ACC1 LUT and 3D ACC2 LUT.

The ACC unit 610 includes three ACC lookup tables 6151-1, 6151-2, and 6151-3, a selector 6153, an output unit 6154, an OR logic circuit unit 6156, and an AND logic circuit unit 6155. A signal input as the ACC unit 610 may include a 3-dimensional image display selection signal 3D_en, an option signal option_en, and the glasses synchronization signal 3D_sync.

When the 3-dimensional image is displayed, 1 (high value) is input as the 3-dimensional image display selection signal 3D_en. When the 2-dimensional image is displayed, 0 (low value) is input as the 3-dimensional image display selection signal 3D_en. Further, when the 2-dimensional image is displayed, any signal is not input as the option signal option_en. But, when the 3-dimensional image is displayed and it is necessary to change the reference gamma data, 0 is input as the option signal option_en. When the reference gamma data is not changed, the value of 1 is the input signal. When the 3-dimensional image is displayed by the option signal option_en, the ACC unit 610 may determine whether to output the reference gamma data while alternately changing the reference gamma data or output only the plurality of non-changed reference gamma data even though the 3-dimensional image is displayed.

When the glasses synchronization signal 3D_sync and the option signal option_en are input to the OR logic circuit unit 6156, and the value of 1 is input as any one of the two signals, 1 is transmitted to the AND logic circuit unit 6155. When both the output of the OR logic circuit unit 6156 and the 3-dimensional image display selection signal 3D_en have the value of 1, the AND logic circuit unit 6155 outputs the value of 1 to the selector 6153.

When the value input to the selector 6153 is 1, the first ACC lookup table 3D ACC1 LUT for the 3-dimensional image is selected. When the value input to the selector 6153 is 0, the second ACC lookup table 3D ACC2 LUT for the 3-dimensional image is selected. In the meantime, when a signal is not input to the selector 6153 because the AND logic circuit unit 6155 has no output signal, the 2D ACC LUT 6151-1 is selected.

FIG. 13 illustrates a table of operating characteristics of the ACC unit according to another exemplary embodiment. In the table, the symbol "x" represents a case having no corresponding signal.

The first row in FIG. 13 illustrates a case in which the 2-dimensional image is displayed. In this case, the option signal option_en is not used, and the glasses 100 need not to be used, so that the 2D ACC LUT 6151-1, which is the basic lookup table displaying the 2-dimensional image, is selected and used.

The second row is a case in which the 3-dimensional image is displayed. In this case, the reference gamma data does not need to be changed by the option signal option_en. Thus, the first ACC lookup table for the 3-dimensional image 3D ACC1 LUT 6151-2, which is the basic lookup table displaying the 3-dimensional image, is selected and used.

The third row is a case in which the 3-dimensional image is displayed, and the reference gamma data needs to be changed by the option signal option_en. In this case, the right lens is opened by the glasses synchronization signal 3D_sync. Thus, the first ACC lookup table for the 3-dimensional image 3D ACC1 LUT 6151-2, which is basically used in the display of the 3-dimensional image, is selected and used.

The fourth row is a case in which the 3-dimensional image is displayed, and the reference gamma data needs to be changed by the option signal option_en. In this case, the left lens is opened by the glasses synchronization signal 3D_sync. Thus, the second ACC lookup table 3D ACC2 LUT 6151-3 for the 3-dimensional image, which is additionally included in the display of the 3-dimensional image, is selected and used in order to compensate for the loss of the charging rate due to the inversion driving.

Depending on the exemplary embodiment, instead of the glasses synchronization signal 3D_sync used in FIGS. 12 and 13, a signal having the same cycle and same waveform as those of the glasses synchronization signal 3D_sync, but different from the glasses synchronization signal 3D_sync by a predetermined time, may be used. The use of the signal may decrease crosstalk when the left eye image is applied to the right eye of the user, or the right eye image is applied to the left eye, by adjusting a lens on/off time of the glasses and a time for displaying the image by the liquid crystal display panel 300. In this case, a slight delay may occur and input to the glasses synchronization signal 3D_sync input to the OR logic circuit unit 6156 of FIG. 12, and the reference gamma data generator 650 may further include an additional delay.

Figure 14:
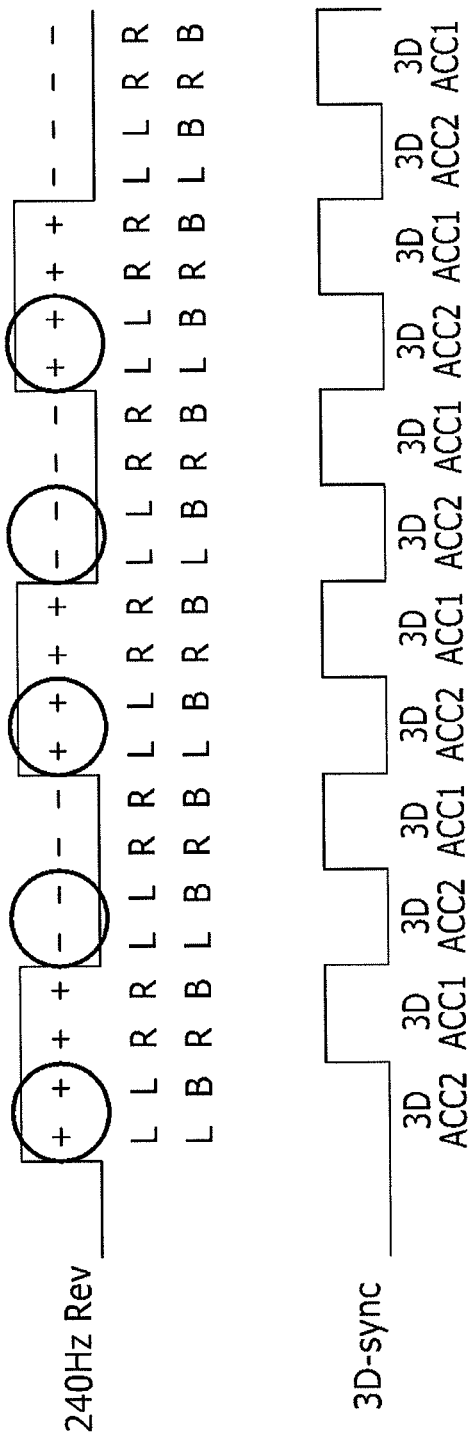
FIG. 14 illustrates another waveform for a 3-dimensional image display device.

FIG. 14 illustrates another waveform of a 3-dimensional image display device. In this embodiment, the waveform has no difference in the polarity reverse signal Rev and the glasses synchronization signal 3D_sync when being compared with that of FIG. 11. That is, the polarity reverse signal Rev has a frequency of 120 Hz, and the glasses synchronization signal 3D_sync has a frequency of 240 Hz. However, the image applied to the liquid crystal display panel 300 may be applied at 240 Hz. Also, the images may be applied to the liquid crystal display panel 300 in an order from the left eye image L, the left eye image L, the right eye image R, to the right eye image R, or an order from the left eye image L, a black image B, the right eye image R, to the black image B.

Even in the exemplary embodiment of FIG. 14, the left eye image L starts to be applied while a polarity thereof is changed. As a result, a charging rate of the left eye image L may be decreased compared to that of the right eye image R. Also, in order to compensate for the decreased charging rate, the exemplary embodiment of FIGS. 12 and 13 may be applied. The polarity reversal signal Rev and the glasses synchronization signal 3D_sync used in FIG. 14 have no difference from those of the exemplary embodiment of FIG. 11, so that the exemplary embodiment of FIGS. 12 and 13 may be applied as it is.

Referring again to FIG. 11, the signal controller 600 includes the DCC unit 620, which may use the lookup table when correcting the image data. However, under some circumstances, it may be difficult to use the lookup table of the DCC unit 620 to compensate for difference of the charging rates between the left eye image and the right eye image when displaying the 3-dimensional image. The reason is that, since the number of lookup tables included in the DCC unit 620 is excessively large, when the lookup table for compensating for the charging rate is added to all of the lookup tables, a large storage space is required, and the amount of data to be added is large, so that it is difficult to actually adopt the lookup table of the DCC unit 620.

Accordingly, the ACC lookup table used by the ACC unit 610 of the signal controller 600 or the lookup table used by the reference gamma data generator 650 of the signal controller 600 may be corrected in accordance with the aforementioned exemplary embodiments.

By way of summation and review, as described above, the 3-dimensional image display device and driving method thereof provides a predetermined luminance by changing the reference gamma data or the lookup table LUT used when displaying the left eye image and the right eye image according to the polarity reversal, thereby preventing a flicker from being viewed.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A 3-dimensional image display device, comprising:
   a signal controller including a reference gamma data generator to correct and output image data;
   a data driver including a gray voltage generator to generate a gray voltage according to an output of the reference gamma data generator, and to receive the image data corrected by the signal controller;
   a display panel including a plurality of pixels, the display panel to display a left eye image and a right eye image based on a data voltage output from the data driver; and
   glasses including a left-eye lens and a right-eye lens controlled by a glasses synchronization signal from the signal controller, wherein
   the signal controller compensates for a difference of charging rates of the left eye image and the right eye image based on the glasses synchronization signal by applying different lookup tables included in a plurality of lookup tables on the left eye image and the right eye image, respectively, the difference of the charging rates of the left eye image and the right eye image being caused by a polarity inversion driving of the pixels, wherein:
   a polarity of the data voltage applied to the display panel is inversed for predetermined frames,
   one image between the left eye image and the right eye image, applied with the polarity inversion, is an inversion compensation image, and
   another image between the left eye image and the right eye image, applied without the polarity inversion, is a non-inversion compensation image, and wherein
   the inversion compensation image and the non-inversion compensation image are compensated by applying the different lookup tables, respectively.

2. The device as claimed in claim 1, wherein:
   the plurality of lookup tables include a lookup table for a 2-dimensional image and a lookup table for a 3-dimensional image, and
   the signal controller uses the different lookup tables, selected between the lookup table for the 2-dimensional image and the lookup table for the 3-dimensional image of the reference gamma data generator, for the left eye image and the right eye image, respectively, based on the glasses synchronization signal such that the difference of the charging rates of the left eye image and the right eye image is compensated.

3. The device as claimed in claim 2, wherein
   the reference gamma data generator generates reference gamma data according to the lookup table for the 2-dimensional image in order to compensate for a charging rate of the inversion compensation image.

4. The device as claimed in claim 3, wherein the reference gamma data generator includes:
   a selector to select a lookup table, other than the lookup table for the 2-dimensional image and the lookup table for the 3-dimensional image,
   an output unit to output the lookup table selected by the selector,
   an OR logic circuit unit to receive the glasses synchronization signal and the option signal, and
   an AND logic circuit unit to receive an output of the OR logic circuit unit and a 3-dimensional image display selection signal, and to output the received output of the OR logic circuit unit and 3-dimensional image display selection signal to the selector.

5. The device as claimed in claim 4, wherein the reference gamma data generator is to:
   generate the reference gamma data by selecting the lookup table for the 2-dimensional image when a 2-dimensional image is displayed,
   select the lookup table for the 2-dimensional image to generate the reference gamma data, when a 3-dimensional image is displayed and the inversion compensation image is displayed, and select the lookup table for the 3-dimensional image to generate the reference gamma data when the 3-dimensional image is displayed and the non-inversion compensation image is displayed.

6. The device as claimed in claim 5, wherein:

when the 3-dimensional image is applied at 120 Hz, the left eye image and the right eye image are alternately applied, and when the 3-dimensional image is applied at 240 Hz, the left eye image, the left eye image, the right eye image, and the right eye image are alternately applied, or the left eye image, a black image, the right eye image, and the black image are alternately applied.

7. The device as claimed in claim 1, wherein:

the plurality of lookup tables include one lookup table for a 2-dimensional image and a first lookup table for the 3-dimensional image and a second lookup table for the 3-dimensional image, which are two lookup tables for a 3-dimensional image, and the signal controller uses the different lookup tables, selected between the two lookup tables for the 3-dimensional image of the reference gamma data generator, the different lookup tables are different according to the left eye image and the right eye image, based on the glasses synchronization signal such that the difference of the charging rates of the left eye image and the right eye image is compensated.

8. The device as claimed in claim 7, wherein:

the reference gamma data generator generates:

reference gamma data according to the first lookup table for the 3-dimensional image in order to compensate for a charging rate of the non-inversion compensation image, and reference gamma data according to the second lookup table for the 3-dimensional image in order to compensate for a charging rate of the inversion compensation image.

9. The device as claimed in claim 8, wherein the reference gamma data generator includes:

a selector to select a lookup table, other than the lookup table for the 2-dimensional image and the two lookup tables for the 3-dimensional image, an output unit to output the lookup table selected by the selector, an OR logic circuit unit to receive the glasses synchronization signal and the option signal, and an AND logic circuit unit to receive an output of the OR logic circuit unit and a 3-dimensional image display selection signal, and to output the received output of the OR logic circuit unit and 3-dimensional image display selection signal to the selector.

10. The device as claimed in claim 9, wherein the reference gamma data generator is to:

generate the reference gamma data by selecting the lookup table for the 2-dimensional image when a 2-dimensional image is displayed, select the second lookup table for the 3-dimensional image to generate the reference gamma data when the 3-dimensional image is displayed and the inversion compensation image is displayed, and select the first lookup table for the 3-dimensional image to generate the reference gamma data when the 3-dimensional image is displayed and the non-inversion compensation image is displayed.

11. The device as claimed in claim 10, wherein:

when the 3-dimensional image is applied at 120 Hz, the left eye image and the right eye image are alternately applied, and when the 3-dimensional image is applied at 240 Hz, the image for the left eye, the left eye image, the right eye image, and the right eye image are alternately applied, or the left eye image, a black image, the right eye image, and the black image are alternately applied.

12. The device as claimed in claim 1, wherein:

the signal controller includes an ACC unit to correct the image data input from the outside considering a gamma characteristic of each color, and the ACC unit includes one ACC lookup table for a 2-dimensional image, a first ACC lookup table for the 3-dimensional image, and a second ACC lookup table for the 3-dimensional image, and the signal controller uses an ACC lookup table, selected between the two ACC lookup tables for the 3-dimensional image of the ACC unit which are different between the left eye image and the right eye image, based on the glasses synchronization signal such that the difference of the charging rates of the left eye image and the right eye image is compensated.

13. The device as claimed in claim 12, wherein:

the ACC unit corrects the image data according to the first ACC lookup table for the 3-dimensional image in order to compensate for a charging rate of the non-inversion compensation image, and the ACC unit corrects the image data according to the second ACC lookup table for the 3-dimensional image in order to compensate for a charging rate of the compensation image.

14. The device as claimed in claim 13, wherein the ACC unit includes:

a selector to select a lookup table, other than the ACC lookup table for the 2-dimensional image and the two ACC lookup tables for the 3-dimensional image, an output unit to output the lookup table selected by the selector, an OR logic circuit unit to receive the glasses synchronization signal and the option signal, and an AND logic circuit unit to receive an output of the OR logic circuit unit and a 3-dimensional image display selection signal, and output the received output of the OR logic circuit unit and 3-dimensional image display selection signal to the selector.

15. The device as claimed in claim 14, wherein the ACC unit:

corrects the image data by selecting the ACC lookup table for the 2-dimensional image when the 2-dimensional image is displayed, selects the second ACC lookup table for the 3-dimensional image to correct the image data when the 3-dimensional image is displayed and the compensation image is displayed, and selects the first ACC lookup table for the 3-dimensional image to correct the image data when the 3-dimensional image is displayed and the non-inversion compensation image is displayed.

16. The device as claimed in claim 15, wherein:

when the 3-dimensional image is applied at 120 Hz, the left eye image and the right eye image are alternately applied, and when the 3-dimensional image is applied at 240 Hz, the left eye image, the left eye image, the right eye image, and the right eye image are alternately applied, or the left eye image, a black image, the right eye image, and the black image are alternately applied.

17. The device as claimed in claim 12, wherein the signal controller includes a DCC unit to correct the image data output from the ACC unit in order to improve a response speed of the display panel.

18. The device as claimed in claim 12, wherein:
the reference gamma data generator includes the lookup table for the 2-dimensional image and the lookup table for the 3-dimensional image, and
the reference gamma data generator generates reference gamma data using the lookup table for the 2-dimensional image when the 2-dimensional image is displayed, and generates reference gamma data using only the lookup table for the 3-dimensional image when the 3-dimensional image is displayed.

19. The 3-dimensional image display device as claimed in claim 1, wherein:
the reference gamma data generated by the reference gamma data generator is transmitted to the gray voltage generator, and
the reference gamma data transferred between the reference gamma data generator and the gray voltage generator is a digital signal.

20. A controller for a 3-dimensional image display device, comprising:
a reference gamma data generator to correct image data;
a gray voltage generator to generate a gray voltage based on the corrected image output from the reference gamma data generator; and
a signal controller to control a display panel to display left-eye and right-eye images based on the gray voltage output from the gray voltage generator, and to control glasses including a left-eye lens and a right-eye lens based on a glasses synchronization signal, wherein
the signal controller compensates for a difference of charging rates of the left-eye and right-eye images based on the glasses synchronization signal by applying different lookup tables on the left eye image and the right eye image, respectively, the difference of the charging rates of the left eye image and the right eye image being caused by a polarity inversion driving of the pixels, wherein:
a polarity of the data voltage applied to the display panel is inversed for predetermined frames,
one image between the left eye image and the right eye image, applied with the polarity inversion, is an inversion compensation image, and
another image between the left eye image and the right eye image, applied without the polarity inversion, is a non-inversion compensation image, and wherein
the inversion compensation image and the non-inversion compensation image are compensated by applying the different lookup tables, respectively.

* * * * *